(12) United States Patent
Vemula et al.

(10) Patent No.: US 7,664,889 B2
(45) Date of Patent: Feb. 16, 2010

(54) DMA DESCRIPTOR MANAGEMENT MECHANISM

(75) Inventors: Kiran Vemula, Worcester, MA (US);
Pak-Iung Seto, Shrewsbury, MA (US);
Victor Lau, Marlboro, MA (US);
William Halleck, Lancaster, MA (US);
Nai-Chih Chang, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 11/240,177

(22) Filed: Sep. 29, 2005

(65) Prior Publication Data

US 2007/0073923 A1   Mar. 29, 2007

(51) Int. Cl.
*G06F 13/28* (2006.01)
*G06F 3/00* (2006.01)

(52) U.S. Cl. .......................... 710/22; 710/52
(58) Field of Classification Search .................... 710/22
See application file for complete search history.

(56) References Cited

U.S. PATENT DOCUMENTS

| | | | |
|---|---|---|---|
| 4,577,314 A * | 3/1986 | Chu et al. | 370/420 |
| 7,185,266 B2 * | 2/2007 | Blightman et al. | 714/776 |
| 2003/0110325 A1 * | 6/2003 | Roach et al. | 710/22 |
| 2006/0047904 A1 * | 3/2006 | Rohde et al. | 711/114 |
| 2006/0136619 A1 * | 6/2006 | Edirisooriya et al. | 710/52 |

OTHER PUBLICATIONS

Ayalasomayajula et al, "DIF (Data Integrity Field): Provides End-to-End Protection of User Data" White Paper, Aug. 31, 2004, Agilent Technologies Inc.*

* cited by examiner

*Primary Examiner*—Niketa I Patel
*Assistant Examiner*—Zachary K Huson
(74) *Attorney, Agent, or Firm*—Christopher K. Gagne

(57) ABSTRACT

A storage device is disclosed. The storage device includes a storage controller. The storage controller includes a direct memory access (DMA) Descriptor Manager (DM) to generate DMA descriptors by monitoring user data and a data integrity field (DIF) transferred between a host memory and a local memory based upon a function being performed.

10 Claims, 4 Drawing Sheets

DMA DESCRIPTOR MANAGEMENT MECHANISM

FIELD OF THE INVENTION

The present invention relates to computer systems; more particularly, the present invention relates to computer system interaction with storage systems.

BACKGROUND

Serial attached storage protocols, such as serial ATA (SATA) and serial Small Computer System Interface (SCSI) (SAS) are becoming more prevalent for connecting storage devices to a computer system. In computer systems implementing such serial storage devices, one storage device in the system may communicate with others. For example, a device requesting data (referred to as the initiator device) may receive data from a target device.

A storage device typically includes a direct memory access (DMA) engine to perform data transfer operations to assist in transferring input/output (I/O) data from (to) a host memory and to (from) a local memory. The DMA engine usually includes a Data Integrity Engine that performs desired data integrity checks (e.g., Cyclic Redundancy Checking (CRC), Application Tag check and/or Reference Tag check etc.). The Data Integrity Engine operates on data blocks which may or may not have data integrity field (DIF). A data block with no DIF typically includes a 512 B (or 520 B, 2 KB, 4 KB etc.). User Data Field and a data block with DIF is a data block appended with an 8 B Data Integrity Field (DIF), also referred to as Block Guard (BG).

When BG is enabled and either an Insert or Strip function is selected, the number of bytes transferred on the local interface of the DMA will not equal the number of bytes transferred on the host interface. Consequently, a programmer of the DMA engine accounts for the expansion or compression of the data stream across descriptors when the Insert or Strip functions are selected. Typically, the programming of the DMA engine (e.g., generating the descriptors by keeping track of the exact amount of user data versus the data integrity data that is being transferred across from the source to the destination) is done in firmware. Programming the DMA engine via firmware is a burden on the local processor, which results in less optimal overall performance. Also, the processor cannot keep up with the ever-increasing link rates, thus affecting the overall system I/O performance.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A hardware automated mechanism for generating DMA descriptors is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
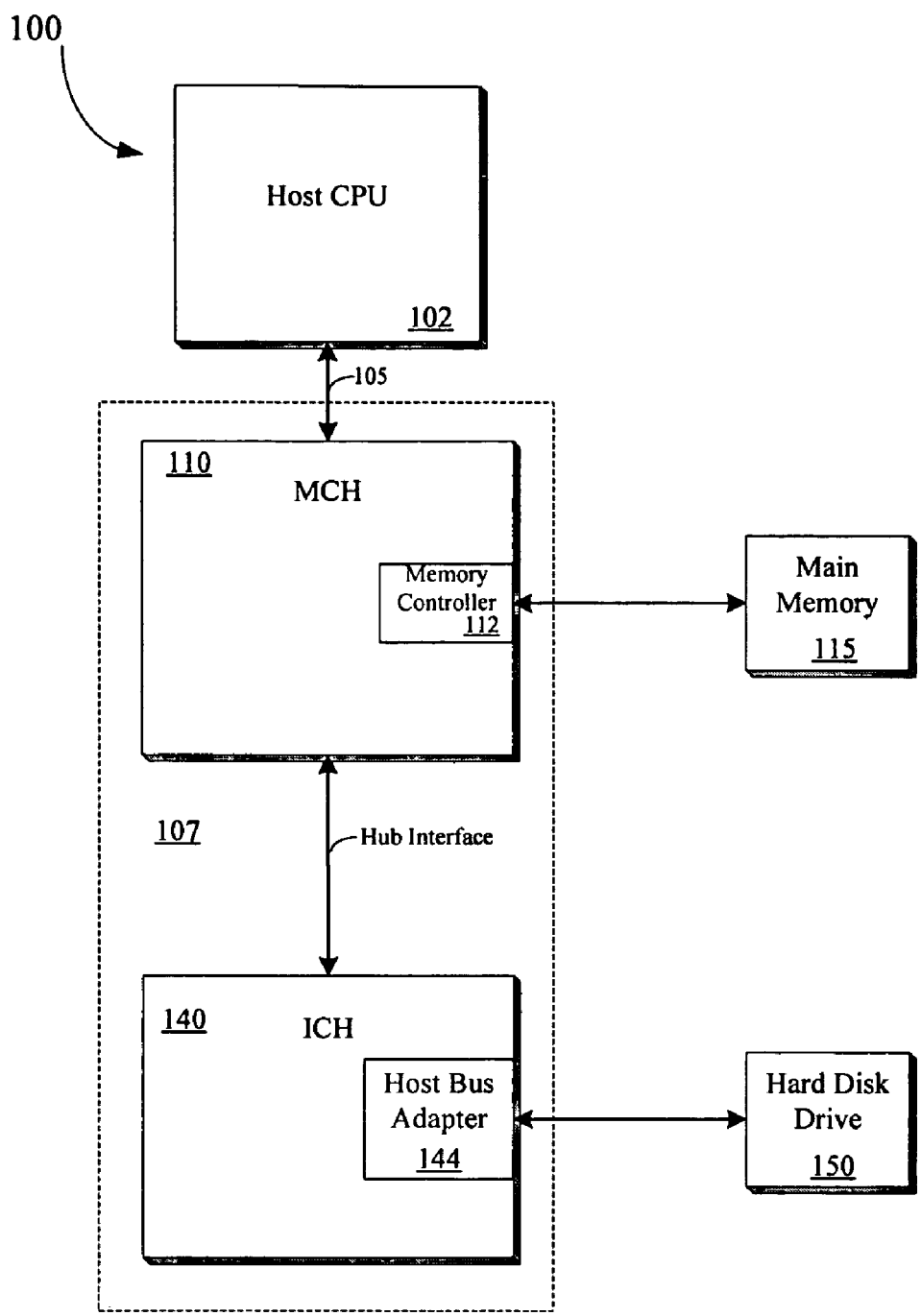
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more storage devices 150. In one embodiment, storage device 150 is a serial SCSI (SSP) drive. However in other embodiments, hard disk drive 150 may be implemented as other serial drives. Thus, HBA 144 is capable of controlling different device types.

Figure 2:
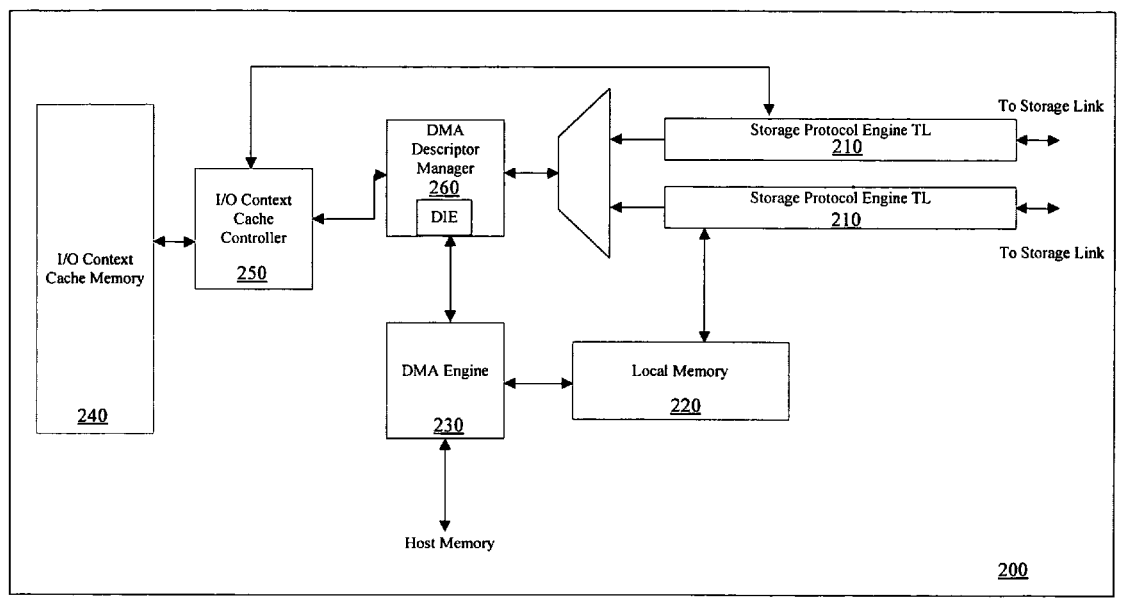
FIG. 2 illustrates one embodiment of a storage controller.

According to one embodiment, HBA 144 includes a storage controller. A storage controller includes one or more storage links with corresponding transport layers (TL's) that process input/output (I/O) control and data frames both on the transmission (Tx) and receiver (Rx) sides of HBA 144. FIG. 2 illustrates one embodiment of a storage controller.

Referring to FIG. 2, the storage controller includes one or more storage links along with corresponding storage protocol engine transport layers (TL's) 210 that process the Tx and Rx I/O control and data frames. A direct memory access (DMA) engine 230 transfers data to and from data buffers in the TL's 210 from and to a host (or external memory) as programmed by a DMA Descriptor Manager (DM) 260.

DM 260 generates descriptors and keeps track of their execution based on the requests made by either the TxTL or the RxTL. Storage controller 200 also includes an I/O context cache memory 240 and an I/O context cache controller 250. DMA engine 230 works on several DMA work queues that temporarily store DMA transactions that are to be performed, usually of varying priorities. The data being moved is initiated by setting up work entries in a DMA engine 230 work queue.

In operation the RxTL or TxTL requests for an I/O sequence to process from an I/O sequence scheduler (not shown) when the I/O sequence scheduler is idle. I/O sequences include one or more I/O tasks that are to be processed. Further, there is a request for task context for the particular I/O sequence from the cache controller 250. A task context is a data stream of one or more tasks that are to be processed. If the I/O sequence is a data frame, the RxTL/TxTL 210 passes on a corresponding context to a Descriptor Generator (not shown) within DM 260 that creates the descriptors for DMA engine 230 based on the requests from TL 210.

In one embodiment, DMA engine 230 features a Data Integrity Field (DIF) or Block Guard (BG) to enable DMA engine 230 to verify, verify and strip, verify and update or calculate and insert a DIF to a source data block depending on control bits set as part of the I/O context. In such an embodiment, the BG is 8 bytes. However in other embodiments, the DIF may be of any length based on the application.

Figure 3:
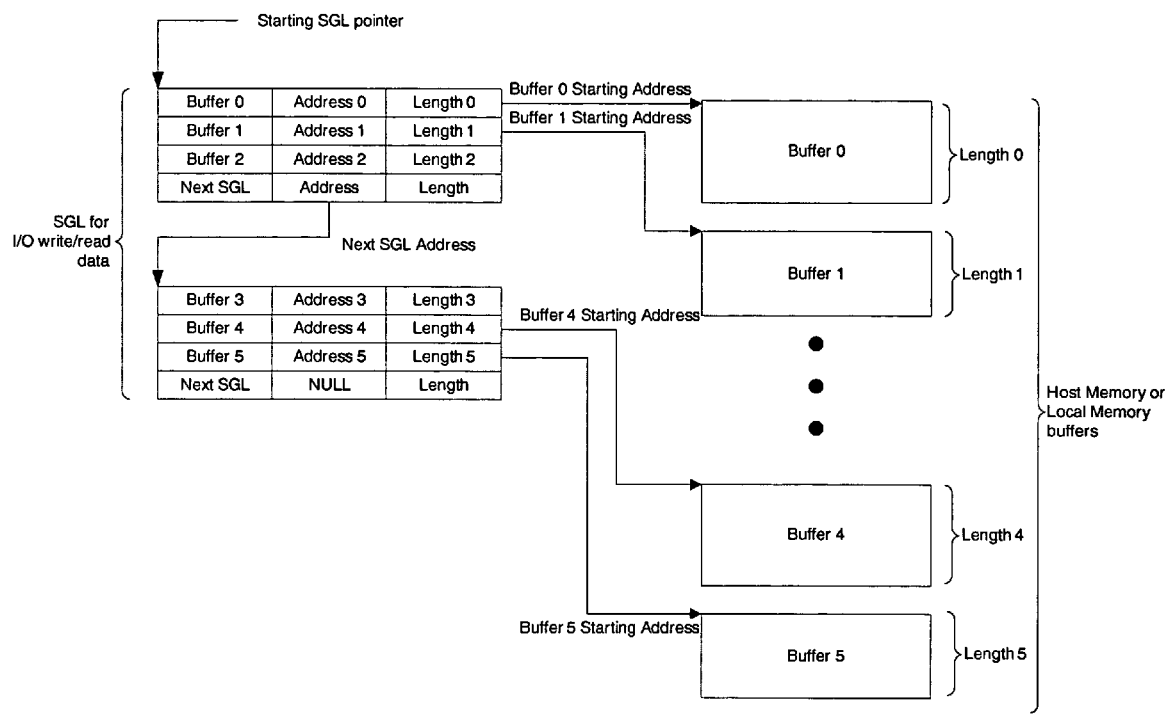
FIG. 3 illustrates one embodiment of a Scatter Gather List.

A descriptor may include a Host Address (HA), Host Byte Count (HBC), Local Address (LA) and Local Byte Count (LBC). FIG. 3 illustrates one embodiment of a scatter gather list (SGL). A scatter-gather list is a structure that includes an array of elements. Each element of the array provides length and starting physical address of a physically contiguous memory region. As shown in FIG. 3, the host memory (e.g., memory 115) is organized as a list of linked address/length (A/L) pairs, where each buffer can be of varied lengths. In one embodiment, the buffers in the local memory are always available (store and forward approach) and have a 1 KB size, while the data block size is 512 B.

According to one embodiment, the storage controller 200 implements a hardware automated mechanism for generating DMA descriptor(s) by keeping track of actual user data and the DIF, when BG is enabled, being transferred to and from the host memory from and to the local memory for each I/O depending on the BG function that is performed. In such an embodiment, the DMA descriptors are generated by considering the lengths of the data buffers and their address locations in both the host memory and local memory.

Further, in the cases where the expanded block data frame received by the storage protocol engine ends with only a current running DIF being received and when a BG function like STRIP or UPDATE/VERIFY or INSERTION is enabled, DM 260 stores the current running DIF in the I/O context. Thus, when the next frame for that particular I/O sequence arrives, DM 260 fetches the corresponding I/O context and includes the retrieved current running DIF data along with received data to synthesize new descriptors.

In yet another embodiment, DM 260 stores partial descriptor component information (e.g., the current scatter gather list pointer (SGL_PTR), host buffer offset, local buffer offset, total bytes transferred etc.) pertaining to an I/O sequence when the transaction layer can multiplex multiple I/O sequences or data streams to a single DM. In such an embodiment, relevant partial descriptor information is stored as part of each of the I/O contexts.

Further the partial descriptor information is stored in a context memory and corresponding I/O is fetched either from the context cache 240 or from the context memory when the DM 260 resumes the descriptor synthesis for the particular I/O sequence or data stream.

In one embodiment, DM 260 includes a data integrity engine that performs data integrity functions on the source data stream for the data blocks. An Insert function converts compressed data blocks into expanded data blocks. Based on user data fields from the compressed data blocks, the DIF is generated and inserted into the data stream subsequent to their respective compressed data blocks.

A Strip function converts expanded data blocks into compressed data blocks. Based on the user data fields from the expanded data blocks, the DIF is generated and verified against the DIF from the respective expanded data blocks. Following the verification, the DIF is removed from the expanded data blocks in the transferred data stream.

An Update function verifies and updates the DIF of expanded data blocks. Based on the user data fields from the expanded data blocks, the DIF is generated and verified against the DIF from the respective expanded data blocks. Subsequently, the generated DIF replaces the verified DIF in the transferred data stream. Use of the Update and Strip functions assumes that the source data includes expanded data blocks while the Insert function assumes that the source data includes compressed data blocks.

A Verify function verifies the DIF of expanded data blocks. Like with the Update function, based on the user data fields from the expanded data blocks, the DIF is generated and only verified against the DIF from the respective expanded data blocks. Unlike with the Update function, no data is modified during the data transfer with Verify function.

According to one embodiment, if STRIP or UPDATE/VERIFY functions are enabled, the total source data byte count should be a multiple of 520 (512 B data plus 8 B BG) and if INSERT is enabled, the total source data byte count should be a multiple of 512. Based on the direction of data movement and the BG function being enabled, there are mechanisms implemented in the Data Integrity Engine for the descriptor generation. These mechanisms include Local to Host STRIP, Local to Host INSERT, Local to Host UPDATE, Host to Local INSERT, Host to Local STRIP, and Host to Local UPDATE.

Figure 4:
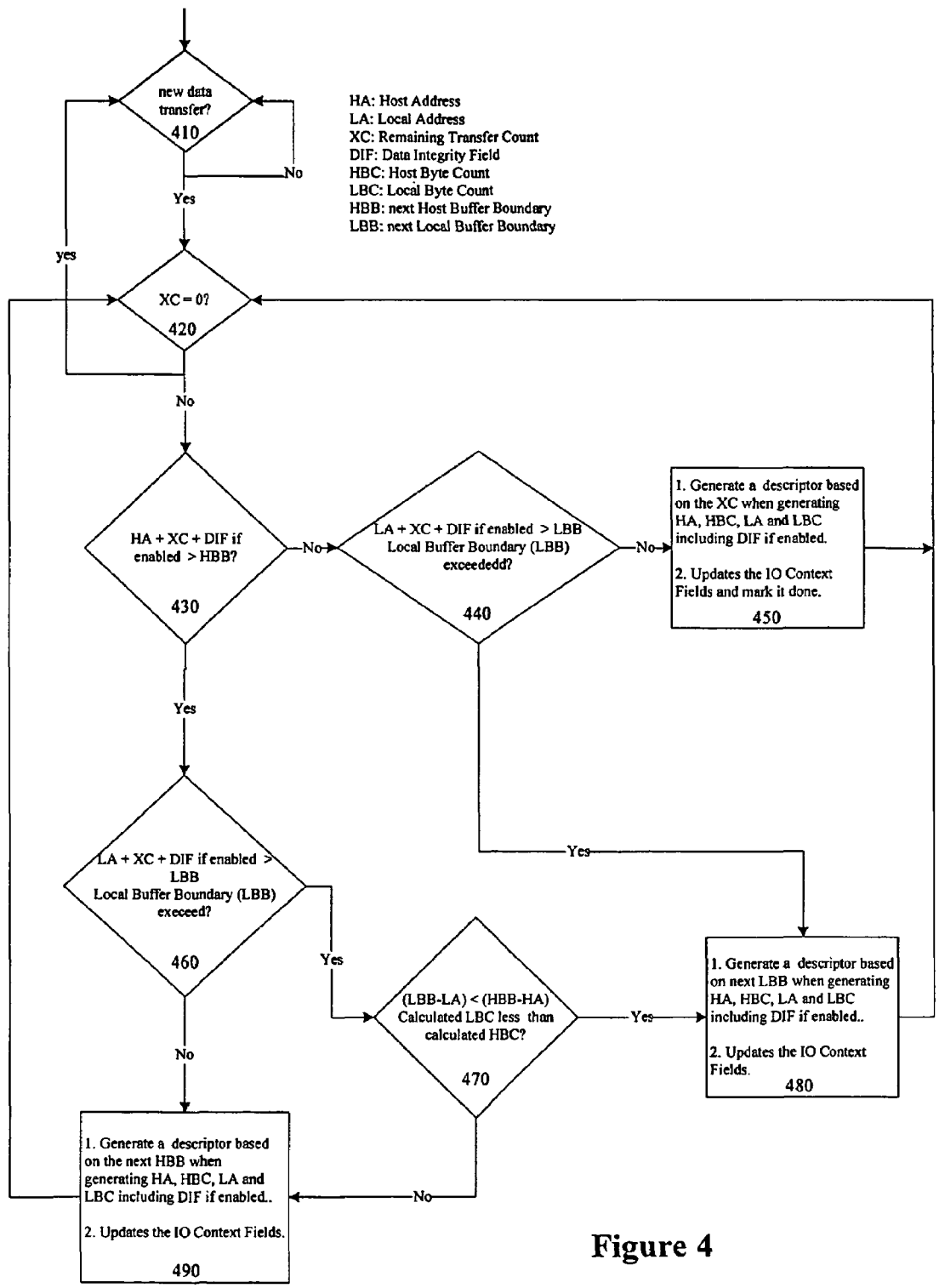
FIG. 4 illustrates one embodiment of a flow diagram for generating descriptors.

FIG. 4 illustrates a flow diagram for one embodiment of generating descriptors. At decision block 410, it is determined whether a new data transfer request has been received. If a new data transfer has been received, it is determined whether a remaining transfer count (XC) is equal to zero, decision block 420. If XC=0, control is returned to decision block 410 where it is again determined whether a new data transfer has been received.

If however XC is not zero, it is determined whether the host address (HA)+XC+DIF, if enabled, is greater than a next host boundary buffer (HBB) (e.g., the HBB has been exceeded), decision block 430. If HA+XC+DIF is not greater than HBB, it is determined whether the local address (LA)+XC+DIF, if enabled, is greater than a next local boundary buffer (LBB) (e.g., the LBB has been exceeded), decision block 440.

If LA+XC+DIF is not greater than HBB, a descriptor is generated based on the XC when generating HA, a host byte count (HBC), LA and a local byte count (LBC), including DIF if enabled, the I/O Context Fields values for the particular context are updated and marked as done, processing block 450. Subsequently, control is returned to decision block 420.

If LA+XC+DIF is not greater than LBB, a descriptor is generated based on the next LBB when generating HA, HBC, LA and LBC, including DIF if enabled, and the I/O Context Fields are updated, processing block 480. Subsequently, control is returned to decision block 420.

Returning to decision block 430, if HA+XC+DIF>HBB, it is determined whether LA+XC+DIF, if enabled, is greater than a LBB, decision block 460. If LA+XC+DIF>LBB, it is determined whether the calculated LBC (LBB−LA)<the calculated HBC (HBB−HA), decision block 470.

If the calculated LBC is greater than the calculated HBC, control is again forwarded to process block 480 where a descriptor is generated based on the next LBB when generating HA, HBC, LA and LBC, including DIF if enabled, and the I/O Context Fields are updated. Subsequently control is returned to decision block 420.

If the calculated LBC is not greater than the calculated HBC, a descriptor is generated based on the next HBB when generating HA, HBC, LA and LBC, including DIF if enabled, and the I/O Context Fields are updated, processing block 490. Subsequently, control is returned to decision block 420. Returning to decision block 460, if LA+XC+DIF is not greater than LBB, control is again forwarded to decision block 490.

Table 1 below illustrates results for descriptor generation for a 5200 B transfer of data from local memory buffers to the host memory with STRIP enabled, assuming that the length of the local memory buffers is 1 Kb, the length of the host memory buffers is 2 KB, the data block size is 512 B and the BG is 8 B.

In this scenario, local buffers L0-L5 store (1024 B), (1024 B), (1024 B), (1024 B), (1024 B) and (80 B), respectively, for a total of 5200 B. The host memory buffer A/L pairs are A0/2 k, A1/2 k, A2/2 k for a total of 5120 B. Thus a first descriptor 1 is generated where the host address (HA) is A0, the local address (LA) is L0, the local byte count (LBC) is 1024 (1016 B data and 8 B BG) and the host byte count (HBC) is 1016, equivalent to the actual amount of data moved to the host buffer.

When the next descriptor to move the next frame stored in local buffer L1, the HA is A0+1016, while LA is L1, LBC is 1024 and HBC is 1008. As illustrated in this scenario, the DM keeps track of the exact byte count transferred from local memory to host memory.

For descriptor 3 24 Bytes of data is transferred from local memory to host memory due to host buffer boundary crossing. The DM should stop on the host buffer boundary and continue working on the next descriptor (descriptor 4) from the next host buffer boundary. Descriptors 6 and 7 have similar reasons for being separated.

TABLE 1

| Number of descriptor | Host Address | Local Address | From Local | To Host | Local Buffer Boundary | DIF stripped | Host Buffer Boundary |
|---|---|---|---|---|---|---|---|
| Descriptor1: | HA = A0 | LA = L0 | LBC = 1024 | HBC = 1016 | 1 Local Buffer | 1 DIF | 1 Host Buffer |
| Descriptor2: | HA = A0 + 1016 | LA = L1 | LBC = 1024 | HBC = 1008 | 1 Local Buffer | 2 DIF | |
| Descriptor3: | HA = A0 + 2024 | LA = L2 | LBC = 32 | HBC = 24 | 1 Local Buffer | 1 DIF | |
| Descriptor4: | HA = A1 | LA = L2 + 32 | LBC = 992 | HBC = 984 | 1 Buffer | 1 DIF | 1Host |
| Descriptor5: | HA = A1 + 984 | LA = L3 | LBC = 1024 | HBC = 1008 | 1 Local Buffer | 2 DIF | |
| Descriptor6: | HA = A1 + 1992 | LA = L4 | LBC = 64 | HBC = 56 | 1 Local Buffer | 1 DIF | |
| Descriptor7: | HA = A2 | LA = L4 + 64 | LBC = 960 | HBC = 952 | 1 Buffer | 1 DIF | 1 Host |
| Descriptor8: | HA = A2 + 952 | LA = L5 | LBC = 80 | HBC = 72 | 1 Local Buffer | 1 DIF | Buffer |

Table 2 illustrates results for descriptor generation for a 5200 B transfer of data from host memory buffers to the local memory with STRIP enabled, assuming that the length of the local memory buffers is 1 KB, the length of the host Memory buffers is 2 KB, the data block size is 512 B and the BG is 8 B.

Descriptor 2 stops at host buffer boundary and descriptor 3 continues on the next data transfer but stops at local buffer boundary. Similarly, descriptor 5 stops at host buffer boundary and descriptor 6 continues on the next data transfer but stops at local buffer boundary.

TABLE 2

| Number of descriptor | Host Address | Local Address | To Local | From Host | Local Buffer Boundary | DIF stripped | Host Buffer Boundary |
|---|---|---|---|---|---|---|---|
| Descriptor1: | HA = A0 | LA = L0 | LBC = 1024 | HBC = 1040 | 1 Local Buffer | 2 DIF | 1 Host Buffer |
| Descriptor2: | HA = A0 + 1040 | LA = L1 | LBC = 1000 | HBC = 1008 | 1 Local Buffer | 1 DIF | |
| Descriptor3: | HA = A1 | LA = L1 + 1000 | LBC = 24 | HBC = 32 | 1 Buffer | 1 DIF | 1 Host |
| Descriptor4: | HA = A1 + 32 | LA = L2 | LBC = 1024 | HBC = 1040 | 1 Local Buffer | 2 DIF | Buffer |
| Descriptor5: | HA = A1 + 1072 | LA = L3 | LBC = 968 | HBC = 976 | 1 Local Buffer | 1 DIF | |
| Descriptor6: | HA = A2 | LA = L3 + 968 | LBC = 56 | HBC = 64 | 1 Buffer | 1 DIF | 1 Host |
| Descriptor7: | HA = A2 + 64 | LA = L4 | LBC = 1024 | HBC = 1040 | 1 Local Buffer | 2 DIF | Buffer |

Table 3 below illustrates results for descriptor generation for a 5120 Byte transfer of data from host memory buffers to the local memory with INSERTION enabled, assuming that the length of the local memory buffers is 1 KB, the length of the host memory buffers is 2 KB, the data block size is 512 B and the BG is 8 B. This implements a total of 5200 Byte local buffer space available for transfer.

In this scenario, local buffers L0-L5 store (1024 B), (1024 B), (1024 B), (1024 B), (1024 B) and (80 B), respectively, for a total of 5200 B. The host memory buffer A/L pairs are A0/2 k, A1/2 k, A2/2 k for a total of 5120 B. Thus, a first descriptor 1 is generated where the host address (HA) is A0, the host byte count (HBC) is 1016, the local address (LA) is L0 and the local byte count (LBC) is 1024 (1016 B data and 8 B BG).

When the next descriptor to move the next data chunk is stored into local buffer L1, the HA is A0+1016, while LA is L1, LBC is 1024 and HBC is 1008. As illustrated in this scenario, the DM keeps track of the exact byte count transferred from host memory to local memory.

Descriptor 3 transfers 24 Bytes of data from host to local due to host buffer boundary crossing. The DM should stop on the host buffer boundary and continue working on the next descriptor (descriptor 4) from the next host buffer boundary. Descriptors 6 and 7 have similar reasons to be separated.

TABLE 3

| Number of descriptor | Host Address | Local Address | To Local | From Host | Local Buffer Boundary | DIF Inserted | Host Buffer Boundary |
| --- | --- | --- | --- | --- | --- | --- | --- |
| Descriptor1: | HA = A0 | LA = L0 | LBC = 1024 | HBC = 1016 | 1 Local Buffer | 1 DIF | 1 Host Buffer |
| Descriptor2: | HA = A0 + 1016 | LA = L1 | LBC = 1024 | HBC = 1008 | 1 Local Buffer | 2 DIF | |
| Descriptor3: | HA = A0 + 2024 | LA = L2 | LBC = 32 | HBC = 24 | 1 Local | 1 DIF | |
| Descriptor4: | HA = A1 | LA = L2 + 32 | LBC = 992 | HBC = 984 | Buffer | 1 DIF | 1Host |
| Descriptor5: | HA = A1 + 984 | LA = L3 | LBC = 1024 | HBC = 1008 | 1 Local Buffer | 2 DIF | Buffer |
| Descriptor6: | HA = A1 + 1992 | LA = L4 | LBC = 64 | HBC = 56 | 1 Local | 1 DIF | |
| Descriptor7: | HA = A2 | LA = L4 + 64 | LBC = 960 | HBC = 952 | Buffer | 1 DIF | 1 Host Buffer |
| Descriptor8: | HA = A2 + 952 | LA = L5 | LBC = 80 | HBC = 72 | 1 Local Buffer | 1 DIF | |

Note that, the insertion from host to local data transfer is just the reverse process of the stripping from local to host data transfer. Also note that, the above mechanism uses local buffer size as the basis to perform the calculation (e.g., the HBC of descriptor is calculated based on the local buffer size including data integrity field). The other or similar method is to use the host buffer size as basis to perform LBC and HBC calculations.

The above-described hardware automated descriptor generation and management of data transfers significantly benefits I/O performance since the task is offloaded from firmware to improve frame processing latency, reduce the firmware's overhead, and improve overall system I/O performance.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A storage device comprising:
a host bus adapter including a storage controller, the storage controller including:
a local memory;
a direct memory access (DMA) engine to insert a data integrity field (DIF) into a data block; and
a DMA Descriptor Manager (DM) to generate DMA descriptors by monitoring user data and the DIF transferred between a host memory and the local memory based upon a function being performed, the DIF being a serial protocol Block Guard (BG), the DM also being to store a current running DIF in an input/output (I/O) context if the function is a particular BG function, the I/O context and the current running DIF being associated with an I/O sequence that includes a current received frame and a next received frame, the current received frame being associated with and used to generate the current running DIF, and the DM being to fetch, after arrival of the next received frame, the I/O context to synthesize new descriptors based upon the current running DIF stored in the I/O context, the next received frame, and upon buffer lengths and locations in the host memory and the local memory included in the DMA descriptors, the DM generating the DMA descriptors based on a request by at least one transport layer corresponding to one or more storage links for the frames.

2. The storage device of claim 1 wherein the DMA descriptor manager generates separate descriptors based on host buffer boundaries and/or local buffer boundaries.

3. The storage device of claim 1 wherein the storage controller further comprises a storage protocol engine.

4. The storage device of claim 1 further comprising an I/O context cache memory.

5. A method comprising:
monitoring, at a direct memory access (DMA) Descriptor Manager (DM), user data and a data integrity field (DIF) transferred between a host memory and a local memory, a host bus adapter comprising the DM; and
the DM generating DMA descriptors based upon the user data and the DIF transferred between the host memory and the local memory and a function being performed, the DIF being a serial protocol Block Guard (BG), the DM also being to store a current running DIF in an input/output (I/O) context if the function is a particular BG function, the I/O context and the current running DIF being associated with an I/O sequence that includes a current received frame and a next received frame, the current received frame being associated with and used to generate the current running DIF, and the DM being to fetch, after arrival of the next received frame, the I/O context to synthesize new descriptors based upon the current running DIF stored in the I/O context, the next received frame, and upon buffer lengths and locations in the host memory and the local memory included in the DMA descriptors, the DM generating the DMA descriptors based on a request by at least one transport layer corresponding to one or more storage links for the frames.

6. The method of claim 5 further comprising the DM generating separate descriptors based on host buffer boundaries and/or a local buffer boundaries.

7. A system comprising:
a host memory; and
a host bus adapter including a storage device including:
  a local memory;
  a direct memory access (DMA) engine to insert a data integrity field (DIF) into a data block; and
  a DMA Descriptor Manager (DM) to generate DMA descriptors by monitoring user data and the DIF transferred between the host memory and the local memory based upon a function being performed, the DIF being a serial protocol Block Guard (BG), the DM also being to store a current running DIF in an input/output (I/O) context if the function is a particular BG function, the I/O context and the current running DIF being associated with an I/O sequence that includes a current received frame and a next received frame, the current received frame being associated with and used to generate the current running DIF, and the DM being to fetch, after arrival of the next received frame, the I/O context to synthesize new descriptors based upon the current running DIF stored in the I/O context, the next received frame, and upon buffer lengths and locations in the host memory and the local memory included in the DMA descriptors, the DM generating the DMA descriptors based on a request by at least one transport layer corresponding to one or more storage links for the frames.

8. The system of claim 7 wherein the DMA descriptor manager to generate separate descriptors based on host buffer boundaries and/or local buffer boundaries.

9. The system of claim 8 wherein the storage device further comprises a storage protocol engine.

10. The system of claim 7 further comprising one or more storage protocol engines.

* * * * *